United States Patent
Kimura et al.

(10) Patent No.: US 10,129,551 B2
(45) Date of Patent: Nov. 13, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Makoto Kimura, Tokyo (JP); Saku Hiwatashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 14/835,013

(22) Filed: Aug. 25, 2015

(65) Prior Publication Data
US 2016/0065977 A1 Mar. 3, 2016

(30) Foreign Application Priority Data
Aug. 28, 2014 (JP) .................................. 2014-174494

(51) Int. Cl.
*H04N 7/12* (2006.01)
*H04N 11/02* (2006.01)
(Continued)

(52) U.S. Cl.
CPC ........... *H04N 19/31* (2014.11); *H04N 19/115* (2014.11); *H04N 19/157* (2014.11);
(Continued)

(58) Field of Classification Search
CPC .... H04N 19/31; H04N 19/115; H04N 19/157; H04N 19/187; H04N 19/44
(Continued)

(56) References Cited

U.S. PATENT DOCUMENTS

| | | | |
|---|---|---|---|
| 2009/0003439 A1* | 1/2009 | Wang | H04N 19/70 375/240.08 |
| 2011/0188459 A1* | 8/2011 | Krishnamoorthi | H04N 21/2383 370/329 |
| 2014/0161176 A1 | 6/2014 | Sun et al. | |

FOREIGN PATENT DOCUMENTS

| | | |
|---|---|---|
| JP | 2003-515987 A | 5/2003 |
| JP | 3519722 B2 | 4/2004 |

(Continued)

OTHER PUBLICATIONS

"Trends in Ultra-High Definition Television", Ministry of Internal Affairs and Communications, Jun. 5, 2013, http://www.soumu.go.jp/main_content/000238399.pdf (Partial translation of the relevant pp. 1, 6, 7, 8, 10, 11 and 16 is included).

*Primary Examiner* — Mehrdad Dastouri
*Assistant Examiner* — Kristin Dobbs
(74) *Attorney, Agent, or Firm* — Canon USA, Inc. I.P. Division

(57) ABSTRACT

An image processing apparatus according to the present invention is configured to encode frames forming a moving image using temporal hierarchies, and includes an acquisition unit configured to acquire information related to a temporal hierarchy corresponding to an encoding target frame, a determination unit configured to determine, based on the information related to the temporal hierarchy acquired by the acquisition unit, whether to use an encoding parameter based on a bit rate of at least one past frame encoded before the encoding target frame is encoded, and an encoding unit configured to encode the encoding target frame using the encoding parameter based on the bit rate of the at least one past frame.

14 Claims, 11 Drawing Sheets

(51) Int. Cl.
*H04N 11/04* (2006.01)
*H04B 1/66* (2006.01)
*H04N 19/31* (2014.01)
*H04N 19/115* (2014.01)
*H04N 19/157* (2014.01)
*H04N 19/187* (2014.01)
*H04N 19/44* (2014.01)
*H04N 19/172* (2014.01)

(52) U.S. Cl.
CPC .......... *H04N 19/187* (2014.11); *H04N 19/44* (2014.11); *H04N 19/172* (2014.11)

(58) Field of Classification Search
USPC .................................................. 375/240.01
See application file for complete search history.

(56) References Cited

FOREIGN PATENT DOCUMENTS

| | | |
|---|---|---|
| JP | 2009-510952 A | 3/2009 |
| JP | 2009-540629 A | 11/2009 |
| JP | 2010-011154 A | 1/2010 |
| JP | 2010-028516 A | 2/2010 |
| JP | 2012-199961 A | 10/2012 |
| JP | 2013-070411 A | 4/2013 |

\* cited by examiner

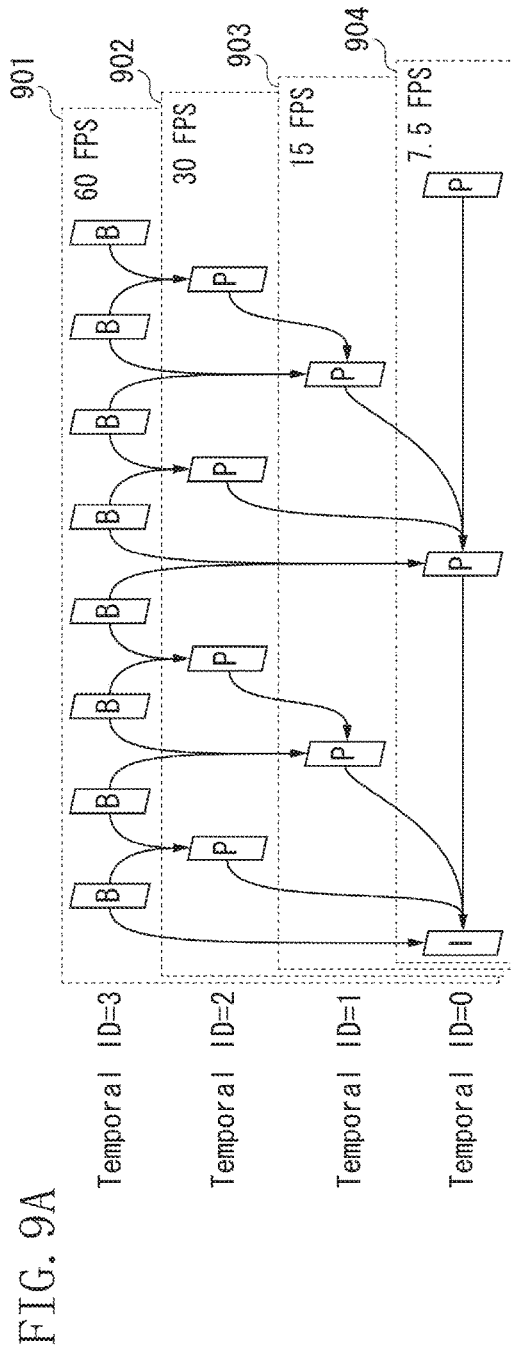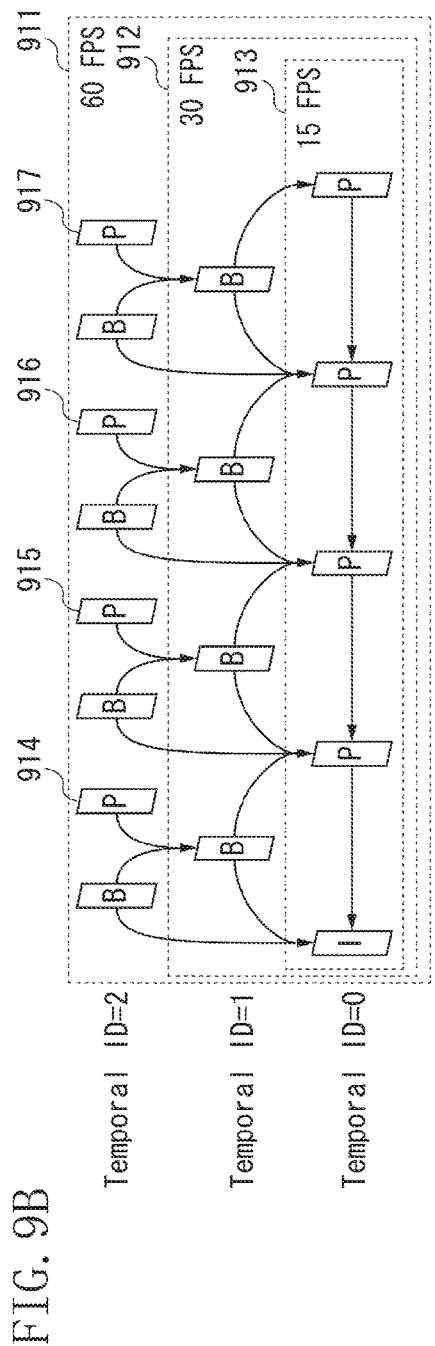

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium, and more particularly relates to a technique using a temporal hierarchy identifier.

Description of the Related Art

High Efficiency Video Coding (HEVC), as an encoding method for compressing and recording a moving image, employs scalable movie encoding as an extension specification. In the scalable movie encoding, a moving image is hierarchically encoded from low quality to higher quality. The scalable video encoding may be classified into a spatial scalability, a temporal scalability, and a signal to noise ratio (SNR) scalability, based on the type of hierarchical target information. The temporal scalability is a technique for hierarchizing in accordance with the change in a temporal scale, that is, the number of frames per unit time (frame rate) in the image encoding. The frame rate can be adjusted by partially extracting data having the hierarchal structure. More specifically, the moving image is encoded in such a manner that a plurality of frame rates can be taken, whereby the frame rates can be flexibly switched in accordance with limitations differing depending on environments such as network transmission and reproduction (decoding) processing.

To achieve the hierarchal encoding corresponding to the temporal scalability described above, the encoding defined in HEVC is performed with a temporal hierarchy identifier (temporal ID) set to each frame in a moving image. The temporal ID is information for identifying each temporal hierarchy. A frame in each hierarchy can be reproduced by referring to a frame corresponding to a value equal to or smaller than a set temporal ID value. Thus, the reproducing (decoding and displaying) is performed by selecting a temporal hierarchy based on the temporal ID.

The relationship between the temporal ID and the frame rate of a moving image that can be selectively reproduced is described below with reference to FIG. 9A. In FIG. 9A, a frame including an intra frame (I frame), a predicted frame (P frame), and a bi-directional predicted frame (B frame) is divided into four hierarchies. In FIG. 9A, the frames in each of the highest to the lowest hierarchies are respectively appended with temporal IDs=3, 2, 1, and 0. By selecting the frame that has been thus appended with the temporal ID and encoded at the time of transmission and reproduction based on the temporal ID, moving images can be formed in four types of frame rates in FIG. 9A. When only the temporal ID=0 (a frame group 904 in FIG. 9A) is selected, the frame rate is 7.5 frames per second (FPS). When the temporal IDs=0 and 1 (frame groups 903 and 904 in FIG. 9A) are selected, the frame rate is 15 FPS. When the temporal IDs=0, 1 and 2 (frame groups 902 to 904 in FIG. 9A) are selected, the frame rate is 30 FPS. When the hierarchies corresponding to all the temporal IDs=0 to 3 (frame groups 901 to 904 in FIG. 9A) are selected, the frame rate is 60 FPS. As described above, a frame rate can be selected on a reception side based on the temporal ID when reproducing a moving image.

A technique for controlling a frame rate on a transmission side is also available in which each frame in a moving image is appended with a priority of processing among frames and the transmission is performed based on the priority (Japanese Patent No. 3519722). In Japanese Patent No. 3519722, a priority of processing related to each frame is appended based on a prediction format (hereinafter, referred to as a frame type) such as an intra-picture reference frame (hereinafter, referred to as an I frame), an inter-picture reference frame (hereinafter, referred to as a P frame), and a bidirectional inter-picture reference frame (hereinafter, referred to as a B frame). The priority level is set based on a dependence relationship among frames used as predictive (reference) images. More specifically, since the I frame may be referred to by both the P and the B frames, the I frame has the highest priority among the three frame types. On the other hand, the B frame is never used as the reference image and thus has the lowest priority. The P frame may be referred to by the B frame and has an intermediate priority lower than the I frame and higher than the B frame.

In the technique discussed in Japanese Patent No. 3519722, a bit rate control is performed based on a transmission condition of a communication path by temporarily thinning the frames (reducing the frame rate) in accordance with the priority appended to each frame. More specifically, the frames with a priority lower than a threshold are thinned out and frames with a priority higher than or equal to threshold are transmitted in accordance with the transmission condition (that is, an effective bit rate) of the communication path. The frames to be transmitted are selected by using the threshold in accordance with the priority of each frame and the transmission condition of the communication path, for example, (1) all the frames, (2) only the frames with [priority: high] (I frame) and with [priority: intermediate] (P frame), or (3) only the frames with [priority: high] (I frame) are elected.

As described above, in Japanese Patent No. 3519722, a transmission frame rate is controlled in such a manner that a frame with a lower priority is cut off (thinned out) based on the priority appended to each frame type and the transmission condition of the communication path, when the effective transmission rate might possibly be exceeded. The number of priorities is limited based on the number of the frame types.

Thus, in a case where the method for selecting the frame rate on the transmission side so that moving image data as a result of frame rate control is reproduced based on the temporal ID, as discussed in Japanese Patent No. 3519722, the following problem arises. For example, suppose the B frame is in a hierarchy corresponding to the temporal ID=1, and the priorities are set to the frame types, such as the I frame [priority: high], the P frame [priority: intermediate], and the B frame [priority: low]. In this case, a group of B frames in the hierarchy corresponding to the temporal ID=1 has a priority lower than a group of P frames in the hierarchy corresponding to the temporal ID=2, and thus may be preferentially thinned out when the frames are transmitted in the method discussed in Japanese Patent No. 3519722. Therefore, when the B frames with the temporal ID=1 are thinned out, a frame group 912 cannot be normally reproduced at 30 FPS as illustrated in FIG. 9B.

Furthermore, frames 914 to 917 in a frame group 911 refer to the B frames in the thinned out frame group 912 as illustrated in FIG. 9B, and thus cannot be reproduced. As described above, when referring to the thinned frames with the temporal ID=1, the frames with temporal ID=2 cannot be reproduced, and thus the frames in the frame group 911 cannot be normally reproduced at 60 FPS as illustrated in the FIG. 9B.

As described above, it is difficult to control moving image data on which the temporal scalability encoding is performed based on the temporal ID, at a desired bit rate or frame rate, in a case where the method discussed in Japanese Patent No. 3519722 is used.

SUMMARY OF THE INVENTION

An image processing apparatus according to the present invention is configured to encode frames forming a moving image using temporal hierarchies, and includes an acquisition unit configured to acquire information related to a temporal hierarchy corresponding to an encoding target frame, a determination unit configured to determine, based on the information related to the temporal hierarchy acquired by the acquisition unit, whether to use an encoding parameter based on a bit rate of at least one past frame encoded before the encoding target frame is encoded, and an encoding unit configured to encode the encoding target frame using the encoding parameter based on the bit rate of the at least one past frame. Thus, an adaptive bit rate control and frame rate control can be implemented based on an effective transmission rate of a communication path, a temporal ID, and the like.

Further features of the present invention will become apparent from the following description of exemplary embodiments with reference to the attached drawings.

BRIEF DESCRIPTION OF THE DRAWINGS

FIGS. 9A and 9B are diagrams illustrating temporal hierarchy identifiers and frame rate hierarchies.

DESCRIPTION OF THE EMBODIMENTS

Exemplary embodiments of the present invention are described in detail below with reference to the attached drawings. The exemplary embodiments described below are merely an example, and the present invention is not limited to the illustrated configurations.

In the exemplary embodiments, a temporal scalability is a technique for performing hierarchizing in accordance with change in a temporal scale, that is, the number of frames per unit time (frame rate) in the image encoding.

Figure 8:
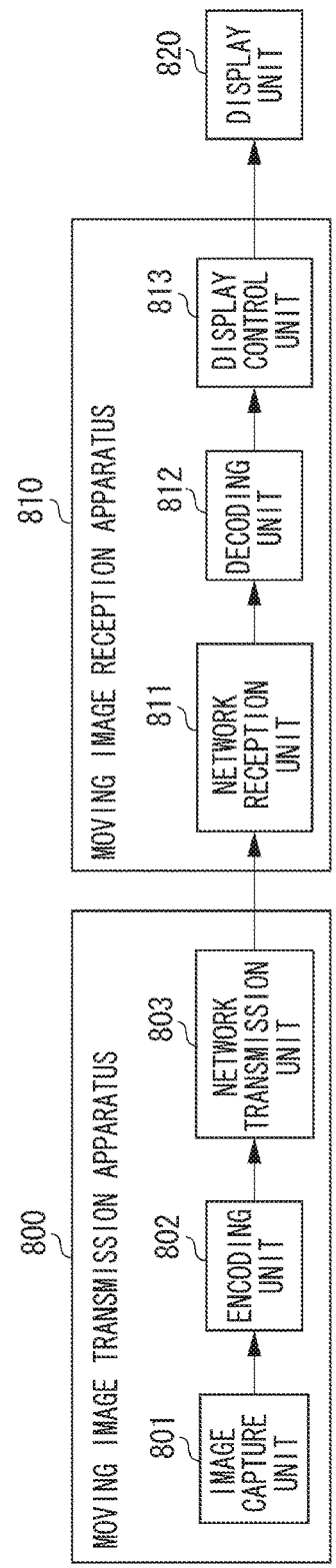
FIG. 8 is a block diagram illustrating an example of a configuration of a moving image transmission and reception system according to the first and the second exemplary embodiments.

A first exemplary embodiment is described below. An image processing apparatus according to the present exemplary embodiment is described with reference to the figures. A configuration of an image processing system according to the present exemplary embodiment is described with reference to FIG. 8. FIG. 8 is a functional block diagram of a moving image transmission and reception system in which moving image data corresponding to a captured moving image is transmitted through a communication path and is displayed on a reception side. The moving image transmission and reception system includes a moving image transmission apparatus 800 (image processing apparatus) and a moving image reception apparatus 810. Each of processing units (801 to 803 and 811 to 813) in FIG. 8 may be formed of a single physical circuit (hardware) or may be formed of a plurality of circuits. Some of the processing units may be integrated into a single circuit.

The moving image transmission apparatus 800 is an example of an image processing apparatus according to the present exemplary embodiment. In the moving image transmission apparatus 800, an image capture unit 801, such as a camera, captures an image of a subject to generate moving image data, and outputs the moving image data to an encoding unit 802. The image capture unit 801 captures the image, as each frame, at a predetermined interval, and generates moving image data including a plurality of the frames. The encoding unit 802 generates encoded data by compressing the moving image data generated by the image capture unit 801 with a moving image encoding method such as H.264 or HEVC, and transmits the encoded data to a network transmission unit 803. The network transmission unit 803 transfers the encoded data output from the encoding unit 802 to the moving image reception apparatus 810 through the communication path. Then, in the moving image reception apparatus 810, a network reception unit 811 receives the encoded data and outputs the encoded data to a decoding unit 812. The decoding unit 812 executes decoding (decompressing) processing on the encoded data output from the network reception unit 811, so that the moving image data is generated (reproduced). A display control unit 813 performs control so that the moving image data generated by the decoding unit 812 is displayed as a visible image on a television (TV) receiver, a personal computer (PC) monitor, a display on a mobile device, or the like. The moving image transmission apparatus 800 and the moving image reception apparatus 810 each further include a storage device that is not illustrated in the figure, and execute the processing by using the storage device as a storage area for various settings or a buffer area for temporal storage.

A data amount of the moving image encoded by the encoding unit 802 changes in accordance with an encoding parameter (image quality setting) such as a quantization parameter (QP) used in the encoding. When a larger QP is used in the encoding, a quantization step becomes larger, and thus an amount (amount of codes) of the encoded data obtained by the encoding becomes smaller, thereby resulting in a larger image quality degradation (lower image quality). On the other hand, a smaller QP used in the encoding leads to a less image quality degradation and a large amount of codes.

Even when the encoding parameter to be used in the encoding is fixed, the amount of the moving image data encoded by the encoding unit 802 changes in accordance with predictability (prediction error or prediction residual) corresponding to a content of an encoding target moving image. Furthermore, an actual transmission rate (effective transmission rate) of the communication path might fluctuate due to a congestion state of the communication path, or environmental factors such as radio wave conditions in a case where wireless communication is employed. When, for example, the effective transmission rate of the communication path is lower than the bit rate of the encoded moving image data, the moving image transmission apparatus 800 cannot transmit the encoded moving image data.

Thus, the display unit 820 controlled by the display control unit 813 may reproduce nothing or partially (intermittently) reproduce moving image data, until the effective transmission rate of the communication path recovers to be at or higher than the bit rate of the moving image data.

The configuration is not limited to the one illustrated in FIG. 8 where the display unit 820 is disposed outside the moving image reception apparatus 810. The display unit 820 may be disposed within the moving image reception apparatus 810.

Figure 2:
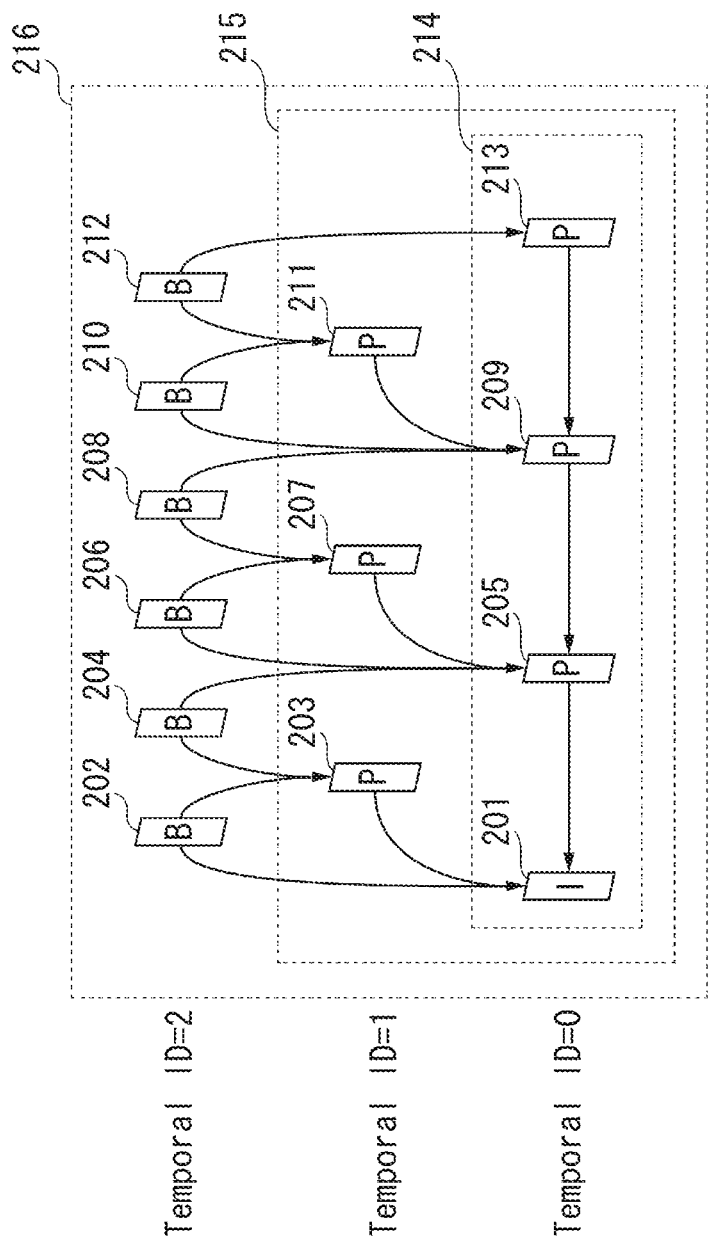
FIG. 2 is a diagram illustrating hierarchies of frame rates corresponding to an intra frame (I frame), a predicted frame (P frame), and a bi-directional predicted frame (B frame) according to the first exemplary embodiment.

Next, a frame configuration of the moving image data according to the present exemplary embodiment will be described with reference to FIG. 2. FIG. 2 illustrates an intra frame (I frame), a predicted frame (P frame), and a bi-directional predicted frame (B frame) that are divided into three hierarchies (temporal IDs=0, 1, and 2). The temporal ID is a temporal hierarchy identifier (identifier allocated to a temporal hierarchy) serving as information for identifying each temporal hierarchy, and is appended to each frame in a moving image. Arrows in the figure indicate directions of inter-frame prediction (a frame referred to by another frame for prediction). When HEVC is used as the moving image encoding method, a prediction across a plurality of I frames can be performed. Thus, an instantaneous decoding refresh (IDR) frame with a limited degree of freedom in prediction is preferably used for the inter-frame prediction instead of the I frame. In the present exemplary embodiment, the I frame and the IDR frame are not distinguished from each other and are both referred to as the I frame for the sake of convenience.

The temporal order (reproduced order) of the frames illustrated in FIG. 2 is a frame 201 (I frame, hereinafter simply referred to as I), a frame 202 (B frame, hereinafter simply referred to as B), a frame 203 (P frame, hereinafter simply referred to as P), a frame 204 (B), a frame 205 (P), a frame 206 (B), a frame 207 (P), a frame 208 (B), a frame 209 (P), a frame 210 (B), a frame 211 (P), a frame 212 (B), and a frame 213 (P). The temporal ID indicating the hierarchy of a frame is appended to each frame. In the present exemplary embodiment, the temporal ID=2 is appended to the frames 202, 204, 206, 208, 210, and 212. The temporal ID=1 is appended to the frames 203, 207, and 211. The temporal ID=0 is appended to the frames 201, 205, 209, and 213.

Next, hierarchy selection processing will be described below. In the hierarchy selection processing, a frame in the moving image data is classified into a low frame rate hierarchy, an intermediate frame rate hierarchy, or a high frame rate hierarchy, based on predetermined temporal hierarchy thresholds. In the present exemplary embodiment, a low frame rate hierarchy 214 is a hierarchy of a frame group with the temporal ID=0 (minimum value). An intermediate frame rate hierarchy 215 is a hierarchy corresponding to the temporal ID=1, and a high frame rate hierarchy 216 is a hierarchy corresponding to the temporal ID=2.

In the present exemplary embodiment, a first threshold (first temporal hierarchy threshold) of the temporal ID distinguishing the low frame rate hierarchy 214 is set to be 0. A second threshold (second temporal hierarchy threshold) of the temporal ID distinguishing the intermediate frame rate hierarchy 215 is set to be 1. More specifically, a frame with a temporal ID smaller than or equal to the first threshold (0) is classified into the low frame rate hierarchy 214. A frame with a temporal ID larger than the first threshold but smaller than or equal to the second threshold (1) is classified into the intermediate frame rate layer 215. In the present exemplary embodiment, each frame rate hierarchy includes a single temporal ID hierarchy. However, this should not be construed in a limiting sense. A single frame rate hierarchy may include a plurality of temporal ID hierarchies. For example, the intermediate frame rate hierarchy may include a frame group 902 (temporal ID≤2) and a frame group 903 (temporal ID≤1). The threshold may be determined based on an instruction by a user from the outside, determined based on a predetermined algorithm, or may be a predetermined value set in advance.

Figure 1:
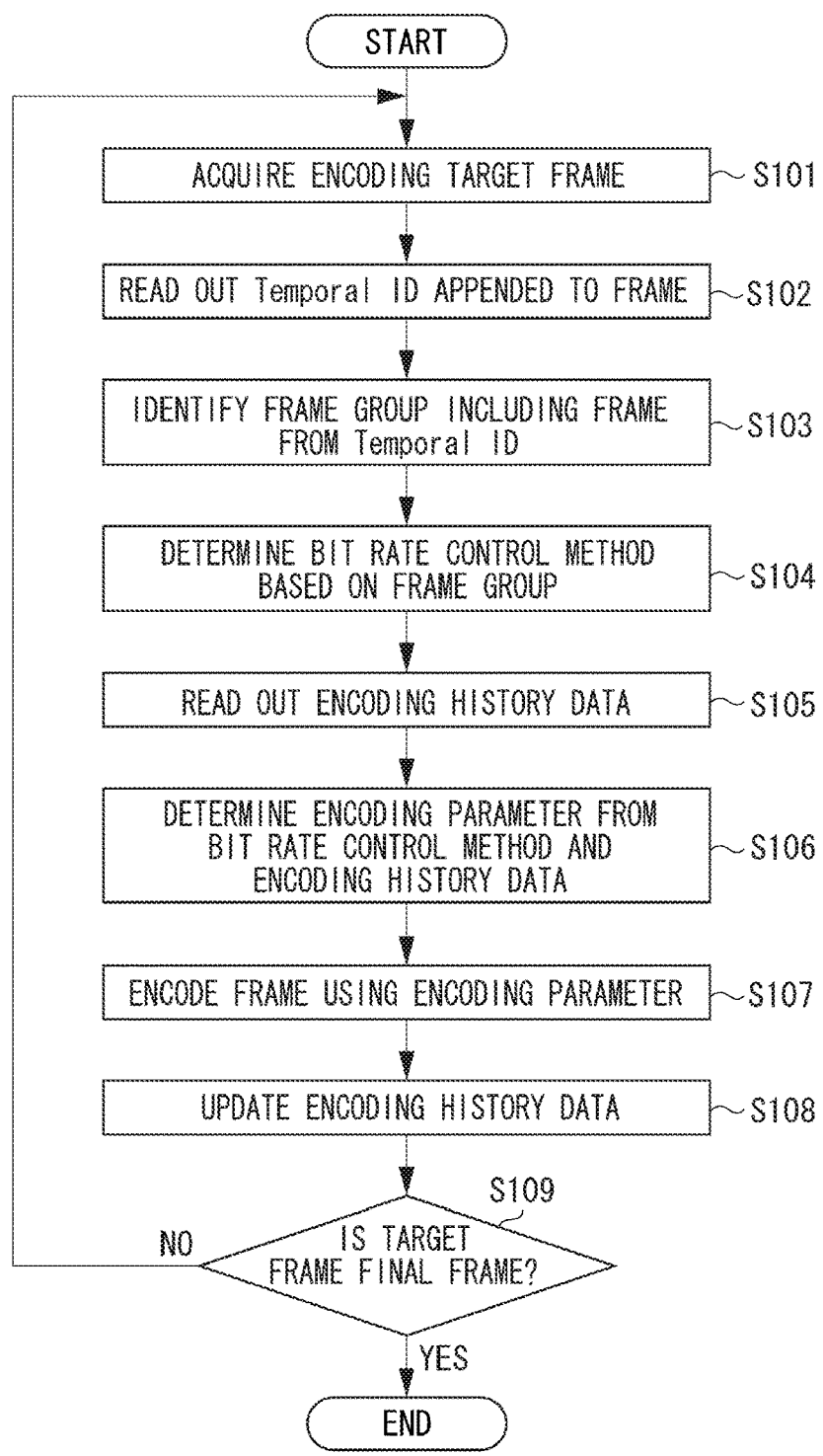
FIG. 1 is a flowchart illustrating encoding processing for each frame according to a first exemplary embodiment.
Figure 11:
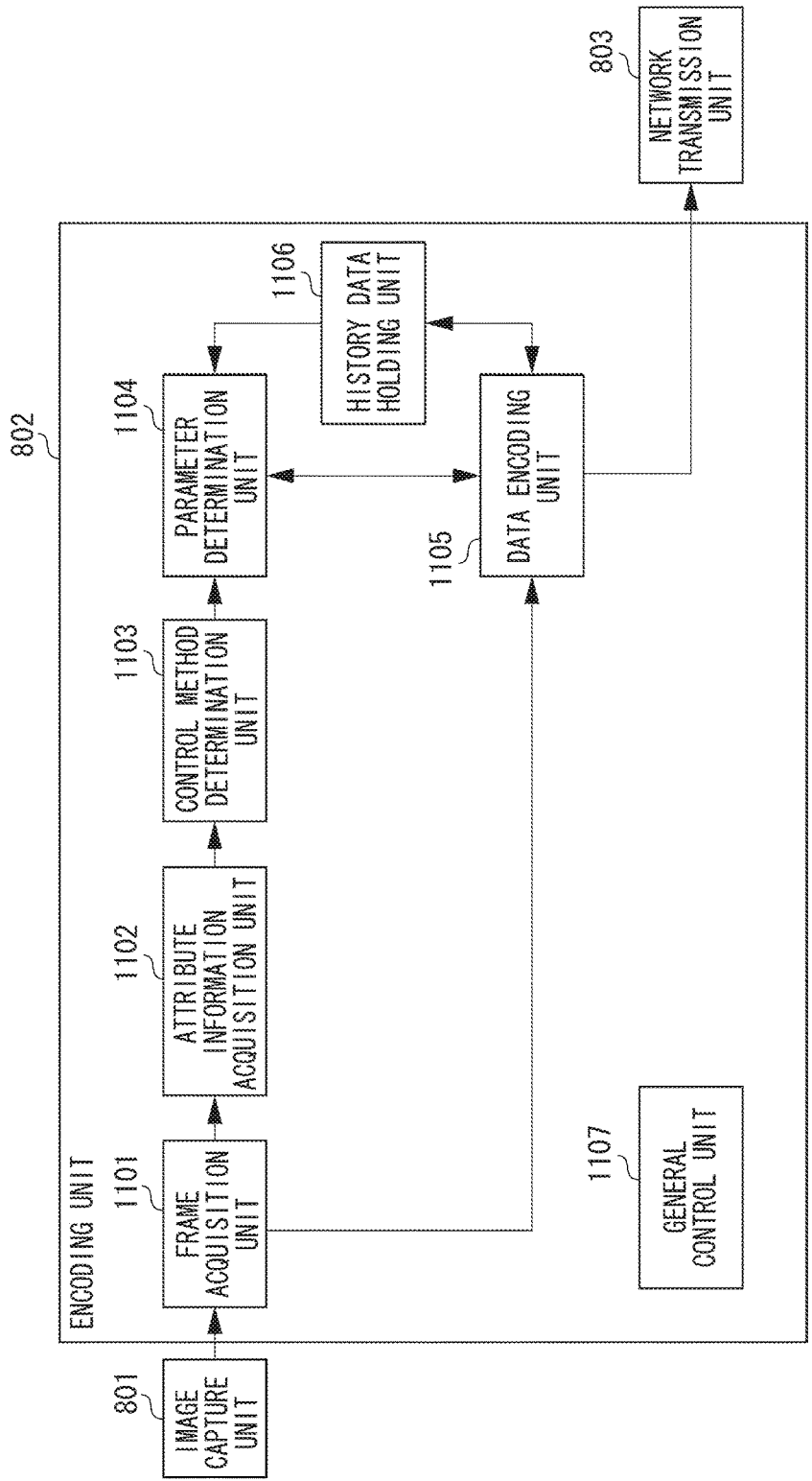
FIG. 11 is a block diagram illustrating an example of an image transmission apparatus according to the first exemplary embodiment.

Encoding processing performed on each hierarchy after the hierarchy selection processing is performed is described below with reference to FIG. 1 and FIG. 11. FIG. 11 is a functional block diagram illustrating processing units of the moving image transmission apparatus 800 according to the present exemplary embodiment. FIG. 1 is a flowchart illustrating the encoding processing executed in the moving image transmission apparatus 800 according to the present exemplary embodiment. When the image capture unit 801 starts capturing a moving image, the processing in FIG. 1 starts.

When the encoding processing starts, in step S101, a frame acquisition unit 1101 of the encoding unit 802 acquires from the storage device of the moving image transmission apparatus 800 an encoding target frame corresponding to the moving image data captured by the image capture unit 801. The frame acquisition unit 1101 may include a buffer which can hold a plurality of frames. Then, in step S102, an attribute information acquisition unit 1102 reads out (acquires) a temporal ID corresponding to the encoding target frame acquired in step S101, which is set by a general control unit 1107, from the storage device. The temporal ID set by the general control unit 1107 may be received by the attribute information acquisition unit 1102 without being stored in the storage device. In step S103, the attribute information acquisition unit 1102 determines a frame group of the encoding target frame, based on the temporal ID read out in step S102. In the present exemplary embodiment, the attribute information acquisition unit 1102 determines a frame group corresponding to any one of temporal IDs=0, 1, and 2 illustrated in FIG. 2 as a frame group of the encoding target frame, and acquires information related to the frame group of the encoding target frame. In step S102 or 103, the attribute information acquisition unit 1102 may perform the reading from the frame acquisition unit 1101 after rearranging the order of the frames based on a reproduction order and an encoding order.

In step S104, a control method determination unit 1103 determines a bit rate control method based on the frame group of the encoding target frame determined by the attribute information acquisition unit 1102 in step S103. Thus, the bit rate control method can be determined based on the temporal ID.

The bit rate control method includes a method for controlling a bit rate for each hierarchy, based on the effective transmission rate of the communication path through which the moving image transmission apparatus 800 transfers the encoding target frame to the moving image reception apparatus 810 after encoding the encoding target frame. The bit rate control method further includes a method for controlling the bit rate for each hierarchy based on a target image quality set by an instruction from the user and a method for controlling the bit rate for each hierarchy based on a remaining capacity of a buffer (not illustrated) in the moving image reception apparatus 810. Furthermore, the bit rate may be controlled based on an accumulated amount (filling rate) in a transmission buffer (not illustrated) in the network transmission unit 803. However, the method is not limited to these. The control method determination unit 1103 may determine at least one of the control methods described above as the bit rate control method. A case is described in the present exemplary embodiment where the control method determination unit 1103 determines the control method based on the effective transmission rate of the communication path as the bit rate control method. More specifically, in the present exemplary embodiment, the bit rate is controlled when encoding is performed so that the bit rate of the frame with the temporal ID that is larger than a predetermined threshold does not exceed the effective transmission rate.

Then, in step S105, a parameter determination unit 1104 reads out from the storage device, encoding history data (encoding history data in the past) related to the frames encoded before the encoding target frame is encoded, based on the bit rate control method determined in step S104. The encoding history data includes information related to the QP as an encoding parameter (image quality parameter) used for encoding moving image data including a plurality of frames. The encoding history data further includes information related to an amount of generated code (data amount after encoding), an accumulated amount of generated code, an average amount of generated code for each of the I frame, the P frame, and the B frame, correspond to the encoding parameter. For example, as the encoding history data, at least one of the amount of generated code (or the average amount of generated code) of the I frame, the P frame, and the B frame in the hierarchy corresponding to each temporal ID, the corresponding QP (or the average QP), and the accumulated amount of generated code, is stored in the storage device when encoding is performed. The present exemplary embodiment is not limited to this. Another piece of information corresponding to the encoding parameter may be stored in the storage device and read out by the parameter determination unit 1104. In step S106, after the processing in step S105 is executed, the parameter determination unit 1104 determines the encoding parameter based on the bit rate control method determined in step S104 and the past encoding history data read out in step S105.

In step S107, a data encoding unit 1105 uses the encoding parameter, determined by the parameter determination unit 1104 in step S106, to encode the encoding target frame acquired by the frame acquisition unit 1101. In step S107, the data coding unit 1105 may encode the encoding target frame read out by the frame acquisition unit 1101 after the order of the frames is rearranged based on the reproduction order and the encoding order.

In step S108, the history data holding unit 1106 updates the encoding history data with the amount of generated code (data amount) after the encoding target frame is encoded in step S107 and the encoding parameter used in the encoding.

When the encoding target frame is not the final frame in the moving image data (No in step S109), the processing returns to step S101, and encoding processing is to be executed on the next frame. When the processing described above is repeated and executed on the final frame (Yes in step S109), the processing is terminated.

Figure 3:
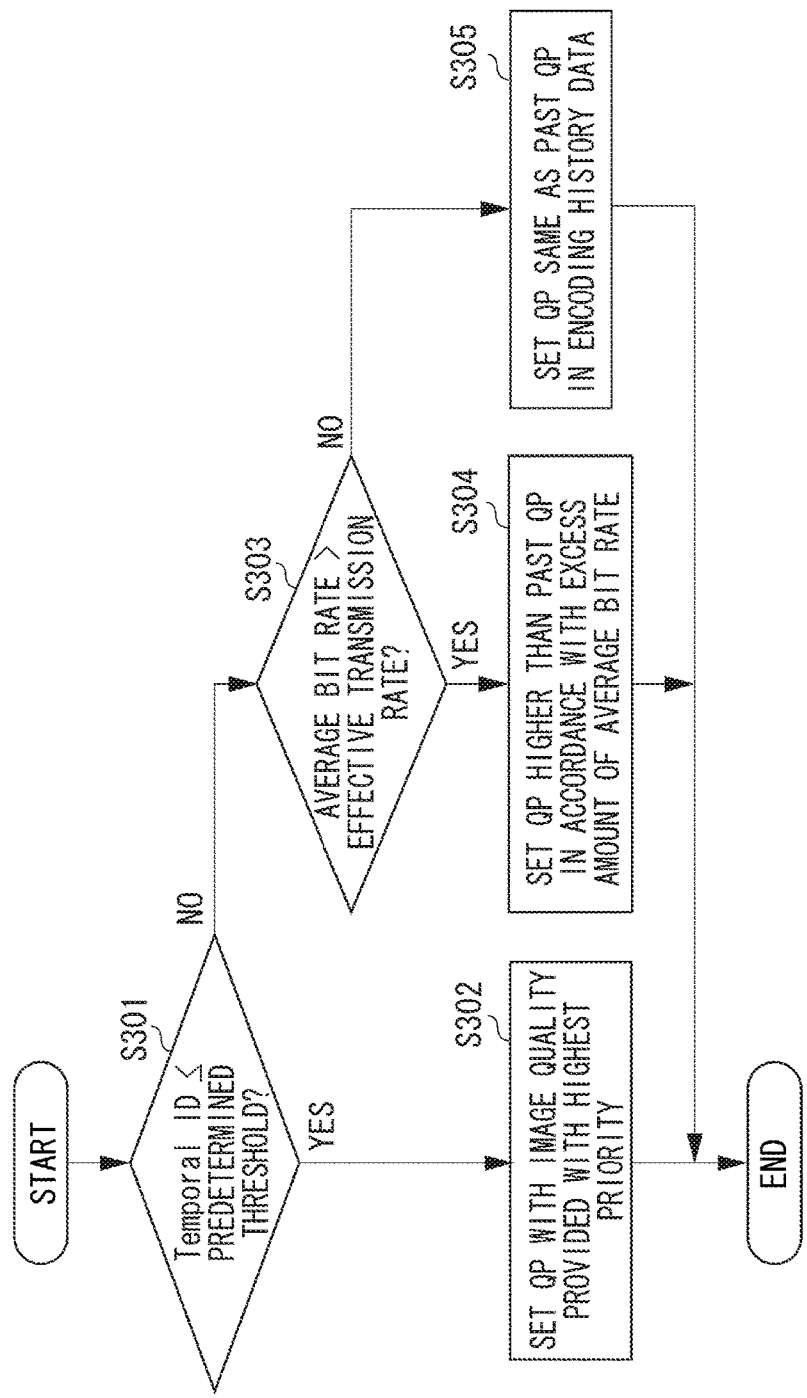
FIG. 3 is a flowchart illustrating encoding parameter determination processing according to the first exemplary embodiment.

FIG. 3 illustrates setting processing for the QP as the encoding parameter determined in step S106 in FIG. 1. It is assumed here that the moving image transmission apparatus 800 identifies the current or the acceptable effective transmission rate related to the transmission by the network transmission unit 803 before the processing is executed. When the processing in step S106 in FIG. 1 starts, in step S301, the parameter determination unit 1104 determines whether the temporal ID of the encoding target frame is equal to or smaller than a predetermined threshold. The predetermined threshold is a first threshold (=0) in the present exemplary embodiment.

First of all, a case is described where the temporal ID of the encoding target frame is 0 in step S301 (Yes in step S301). Here, in step S302, the parameter determination unit 1104 sets QP1, which is a low QP putting the highest priority on image quality, as the QP to be used when the encoding target frame is encoded. The QP set in step S302 is not limited to the QP1. More specifically, from among the frames encoded before the encoding target frame is encoded, which are held in the encoding history data, the QP of the frame with the temporal ID=0 may be directly used as the QP of the encoding target frame. The QP setting processing in step S302 is executed without depending on the effective transmission rate value.

On the other hand, when the temporal ID of the encoding target frame is not 0 in step S301 (No in step S301), the processing proceeds to step S303. In step S303, the parameter determination unit 1104 determines whether the average bit rate calculated up to the present time point (the encoding target frame) using the encoding history data exceeds the effective transmission rate. When the average bit rate exceeds the effective transmission rate in step S303 (Yes in step S303), the processing proceeds to step S304. In step S304, the parameter determination unit 1104 sets the QP to be used to encode the encoding target frame, based on an excess amount of the average bit rate and the amount of generated code corresponding to the QP that is in encoding history data and can achieve the average bit rate equal to or smaller than the effective transmission rate. In step S303, the parameter determination unit 1104 sets a high QP2, putting the highest priority on the amount of codes, as the QP to be used to encode the encoding target frame.

When the average bit rate does not exceed the effective transmission rate in step S303 (No in step S303), the processing proceeds to step S305. In step S305, the parameter determination unit 1104 sets a QP3 as the QP for encoding the encoding target frame. The QP 3 is based on a past QP used to encode a frame prior to the encoding target frame and is stored in the encoding history data. The QP 3 value may be equal to the past QP value.

After the QP is set in any one of steps S302, 304, and 305, the QP setting processing is terminated. The QP2 and the QP3, set in steps S304 and S305, respectively, satisfy the relationship of QP3≤QP2.

Figure 4:
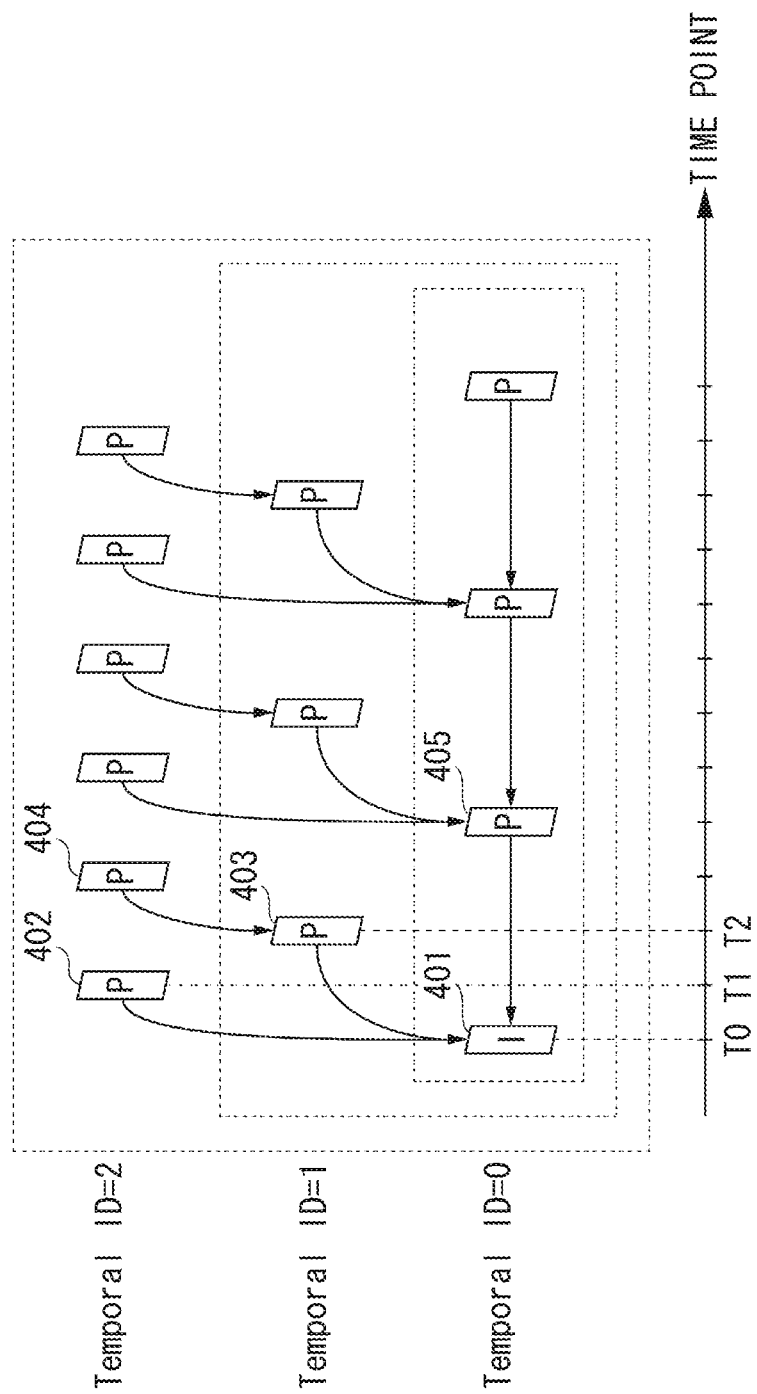
FIG. 4 is a diagram illustrating hierarchies of frame rates corresponding to the I frame and the P frame according to the first exemplary embodiment.
Figure 5:
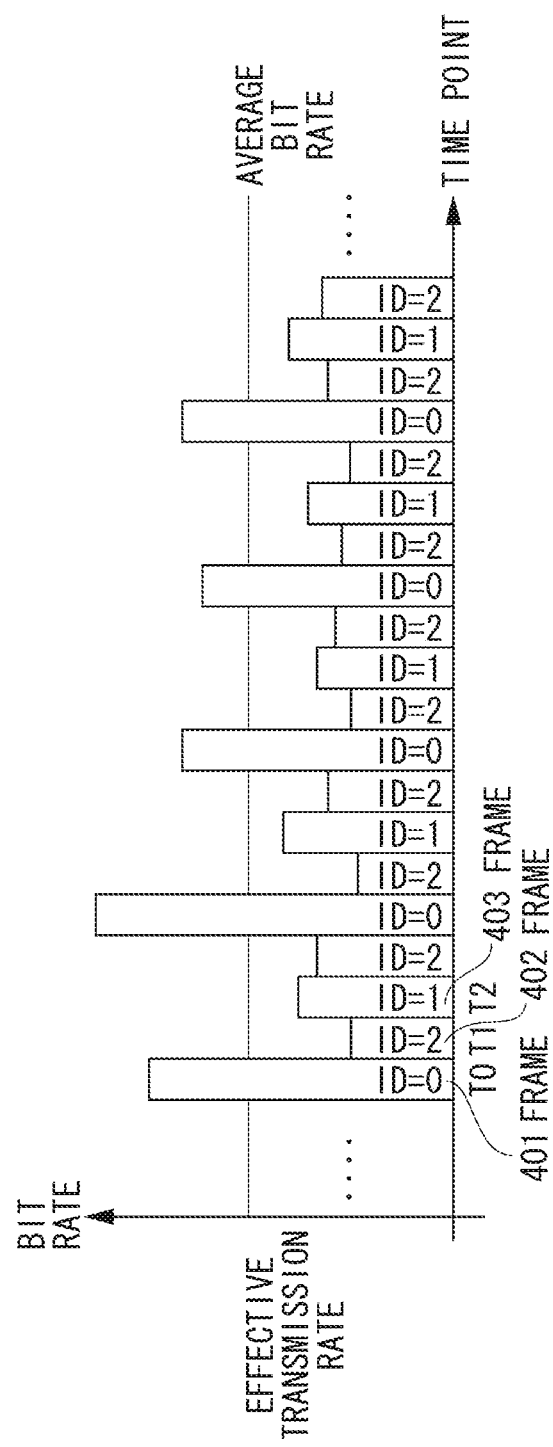
FIG. 5 is a diagram illustrating transition of a bit rate according to the first exemplary embodiment.

FIG. 5 illustrates an example of transition of the bit rate controlled in the flowcharts in FIGS. 1 and 3, provided that the configuration of the frames in the moving image data as the encoding target is as illustrated in FIG. 4. In FIG. 5, the horizontal axis represents a time point at which each frame is reproduced, and the vertical axis represents the bit rate at the time when each frame is encoded. The temporal ID is simply written as ID in FIG. 5.

A frame 401 at a time point T0 corresponds to the temporal ID=0 (equal to or smaller than the predetermined threshold=0). Thus, the parameter determination unit 1104 of the encoding unit 802 makes a determination of Yes in step S301 in FIG. 3, and sets the QP putting the highest priority on image quality in step S302.

A frame 402 at the next time point T1 corresponds to the temporal ID=2 (larger than the predetermined threshold=0). Furthermore, the average bit rate calculated up to the present time point using the encoding history data, that is, the average bit rate at the time point T0, exceeds the effective transmission rate. Thus, the parameter determination unit 1104 of the encoding unit 802 makes a determination of No in step S301 and then Yes in step S303, and sets the QP based on the excess amount of the average bit rate in step S304.

A frame 403 at the next time point T2 corresponds to the temporal ID=1 (larger than the predetermined threshold=0). Furthermore, the average bit rate at the time point T1 is equal to or smaller than the effective transmission rate. Thus, the parameter determination unit 1104 of the encoding unit 802 makes a determination of No in both steps S301 and S303, and thus the processing in step S305 is executed. In step S305, the parameter determination unit 1104 of the encoding unit 802 sets a QP that is the same as the QP corresponding to a frame encoded before the encoding target frame is conceded, which is held in the encoding history data, as the QP corresponding to the encoding target frame.

With the processing described above, as illustrated in FIG. 5, the bit rate of the frame in the hierarchy showing the temporal ID that is equal to or smaller than the predetermined threshold (or the average bit rate calculated up to the frame) is allowed to exceed the effective transmission rate so that the image quality is prioritized. The bit rate of the frame in the hierarchy with the temporal ID larger than the predetermined threshold (or the average bit rate calculated up to the frame) is controlled not to exceed the effective transmission rate. Thus, the average bit rate covering all the hierarchies (all the frames corresponding to the temporal IDs 0 to 2) can be prevented from exceeding the effective transmission rate, even though the bit rate at the time of encoding locally exceeds the effective transmission rate. As described above, according to the present exemplary embodiment, the average bit rate can be smoothed.

When the control processing described in the present exemplary embodiment is not executed, and the frames of the same type but with different temporal IDs are thinned out with the same priority, the following problem might occur. For example, in FIG. 9B, when a B frame in a hierarchy corresponding to the temporal ID=1 and a B frame in a hierarchy corresponding to the temporal ID=2 are thinned out with the same priority, the frame rate of 30 FPS and 60 FPS cannot be achieved in the hierarchies corresponding to the temporal IDs=1 and 2, respectively. However, in the present exemplary embodiment, a quantization parameter is set based on the temporal ID and the condition of the communication path. Thus, the control processing can be performed based on the temporal ID at a desired frame rate and a desired bit rate.

The predetermined threshold to be compared with the temporal ID in step S301 in FIG. 3 is not limited to the first threshold as in the present exemplary embodiment, and may be the second threshold different from the first threshold.

In the present exemplary embodiment, moreover, the control method based on the effective transmission rate of the communication path is described. However, this should not be construed in a limiting sense. An amount of data received by the moving image reception apparatus 810 for a predetermined period of time may be measured and fed back to the moving image transmission apparatus 800. Thus, the moving image transmission apparatus 800 may determine the QP based on the feedback. Furthermore, the QP may be determined based on the measured amount of encoded data output from the moving image transmission apparatus 800 for a predetermined period of time or based on an amount of transmitted encoded data that is calculated from the capacity of the transmission buffer.

A second exemplary embodiment is described below. In the first exemplary embodiment described above, the control processing in FIG. 3 is performed. More specifically, the excess amount of the bit rate of the frame appended with a temporal ID not larger than the predetermined threshold (frame 401 in FIG. 4) is adjusted by the subsequent frame (frame 402 in FIG. 4). In the present exemplary embodiment, the excess amount of bit rate is distributed in accordance with the temporal ID of the frame in the hierarchy corresponding to the temporal ID larger than the predetermined threshold, so that the average bit rate is adjusted. The configuration of the moving image transmission and reception system according to the present exemplary embodiment may be the same as that in the first exemplary embodiment and thus will not be described.

Figure 6:
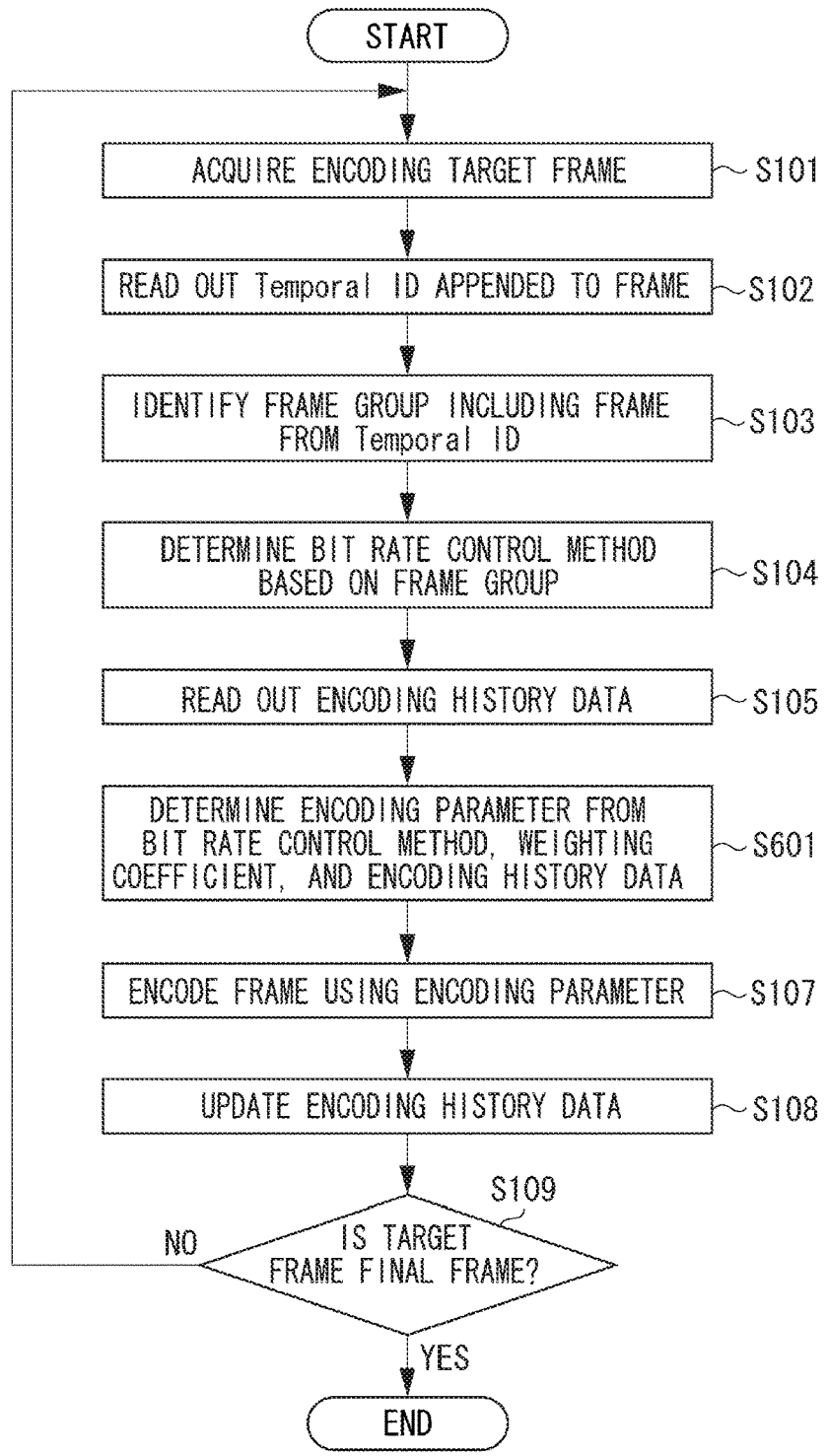
FIG. 6 is a flowchart illustrating encoding processing for each frame according to a second exemplary embodiment.

FIG. 6 is a flowchart illustrating encoding processing according to the present exemplary embodiment. The processing steps other than step S601 is the same as that in FIG. 1, and thus will not be described. In step S601, the encoding unit 802 determines an encoding parameter (QP) used to encode the encoding target frame, based on the frame group of the encoding target frame, the past encoding history data, and a weighting coefficient described later.

Figure 7:
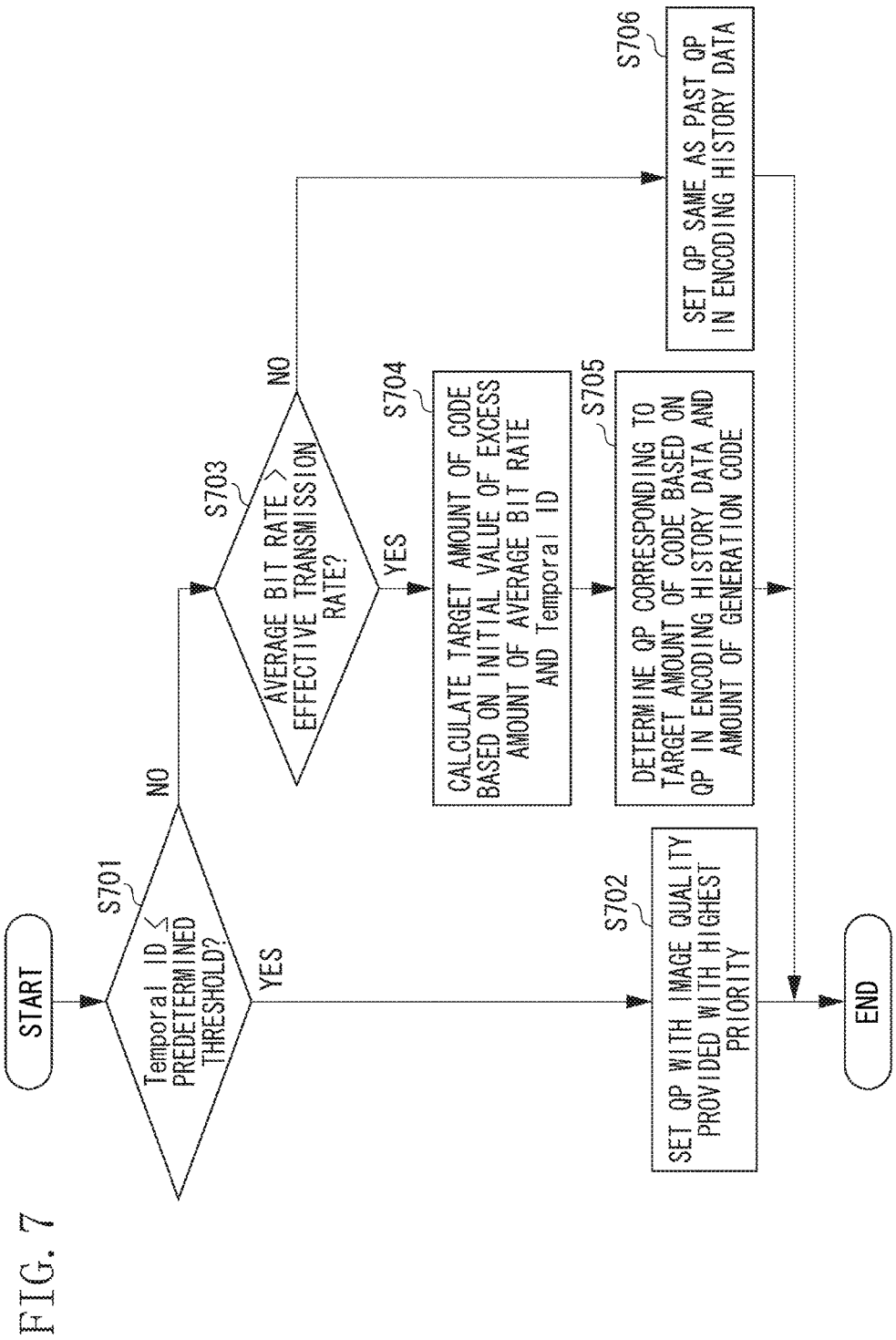
FIG. 7 is a flowchart illustrating encoding parameter determination processing according to the second exemplary embodiment.

FIG. 7 is a flowchart illustrating setting processing for the QP as the encoding parameter determined in step S601 in FIG. 6. When the processing in step S601 in FIG. 6 starts, in step S701, the encoding unit 802 determines whether the temporal ID of the encoding target frame is equal to or smaller than the predetermined threshold. The predetermined threshold is the first threshold (=0) in the present exemplary embodiment.

When the temporal ID of the encoding target frame is equal to or smaller than the threshold (when Temporal ID=0) in step S701 (Yes in step S701), the processing proceeds to step S702. In step S702, the encoding unit 802 sets a low QP putting the highest priority on image quality, as the QP used to encode the encoding target frame, and the processing is terminated. In step S702, the QP of the frame with the same temporal ID (that is, the temporal ID=0) in the frames encoded before the encoding target frame is encoded and held in the encoding history data may be directly used.

On the other hand, when the temporal ID of the encoding target frame is larger than the threshold (when Temporal ID=0) in step S701 (No in step S701), the processing proceeds to step S703. In step S703, the encoding unit 802 determines whether the average bit rate calculated up to the present time point from the encoding history data exceeds the effective transmission rate. When the average bit rate exceeds the effective transmission rate in step S703 (Yes in step S703), the encoding unit 802 calculates a target bit rate of the encoding target frame in step S704.

A method for calculating the target bit rate in step S704 is described below. Here, an initial value of the excess amount of the average bit rate and the temporal ID of the encoding target frame are used to determine the target bit rate. The initial value of the excess amount of the average bit rate represents the excess amount of the average bit rate with respect to the effective transmission rate immediately after the frame with the temporal ID that is equal to or smaller than the predetermined threshold is encoded. When the average bit rate does not exceed the effective transmission rate, the initial value of the excess amount is 0. The excess amount described above is referred to as the initial value of the excess amount to be distinguished from the average bit rate immediately after the frame with the temporal ID larger than the predetermined threshold is encoded.

A bit rate reduction amount for each frame corresponding to the excess amount of the average bit rate is determined based on the weighting corresponding to the temporal ID. More specifically, the target amount of codes for each frame is determined in such a manner that the average bit rate is reduced by $\alpha B$ in the frame group corresponding to the temporal ID=1, where $\alpha(0 \leq \alpha < 0.5)$ represents the weighting coefficient and B represents the excess amount initial value. Similarly, the target amount of codes for each frame is determined in such a manner that the average bit rate is further reduced by $(1-\alpha)B$ in the frame group corresponding to the temporal ID=2. In the present exemplary embodiment, $\alpha$ is set to satisfy $0 \leq \alpha < 0.5$ so that the reduction amount of the average bit rate in the frame group corresponding to the temporal ID=1 is smaller than the reduction amount of the average bit rate in the frame group corresponding to the temporal ID=2. Thus, the weighting is performed in accordance with the temporal ID.

A further description is given with reference to FIG. 4. The target amount of code for each frame is set in such a manner that the average bit rate with the excess amount initial value B at the time point where the encoding of the frame 401 is completed (immediately after the encoding) is reduced by $(1-\alpha)B/2$ at the time point where the encoding of each of the frames 402 and 404 is completed. Thus, a setting value is taken for reducing the average bit rate by $\alpha B$ in the frame group corresponding to the temporal ID=2 (two frames 402 and 404). Similarly, the target amount of coding for the frame 403 is determined in such a manner that the average bit rate is reduced by $\alpha B$ at the time point where the encoding of the frame 403 is completed. More specifically, in the processing in step S704, the average bit rate might possibly exceed the effective transmission rate at the point where the encoding of each of the frames 402 and 403 is completed, but falls below the effective transmission rate at the point where the encoding of the frame 404 is completed.

Then, in step S705, the QP of the encoding target frame is determined based on the amount of generated code corresponding to the QP of the frame group held in the encoding history data in such a manner that the amount equal to or smaller than the target amount of code set in step S704 is obtained. Then, the processing is terminated.

When the average bit rate does not exceed the effective transmission rate in step S703 (No in step S703), the processing proceeds to step S706. In step S706, the encoding unit 802 sets the past QP, held in the encoding history data, as the QP of the encoding target frame, and the processing is terminated.

In the processing described above, the bit rate at the time of encoding the frame in the hierarchy corresponding to the temporal ID=0 can exceed the effective transmission rate so that the image quality is prioritized. Then, the resultant excess amount of the average bit rate is reflected in weighting in the encoding of the frame in the hierarchy corresponding to the temporal ID$\geq$1. Thus, the control is performed so that the average bit rate falls below the effective transmission rate until the next frame in the hierarchy corresponding to the temporal ID=0 is encoded. Thus, as in the first exemplary embodiment, even when the bit rate at the time of encoding locally exceeds the effective transmission rate, the average bit rate covering all the hierarchies (all the frames with the temporal IDs 0 to 2) does not exceed the effective transmission rate.

In the present exemplary embodiment, the bit rate can be controlled by setting the quantization parameter based on the temporal ID and the condition of the communication path. Thus, the control can be performed based on the temporal ID so that the desired frame rate and the desired bit rate are taken.

The weighting method according to the present exemplary embodiment is merely an example and thus should not be construed in a limiting sense. More specifically, in the frame configuration illustrated in FIG. 9A, control may be performed so that the excess amount of the bit rate produced in the frame with the temporal ID=0 is adjusted by the frames with the temporal IDs=1, 2, and 3. The weighting may be performed further based on the number of frames in each hierarchy. For example, a weighting coefficient determined based on the ratio of the number of frames is $\beta(0 \leq \beta \leq 1)$. Here, when the average bit rate is adjusted with a single frame in the hierarchy corresponding to the temporal ID=1 and two frames in the hierarchy corresponding to the temporal ID=2, the weighting coefficient is defined as $\beta=\frac{1}{2}$, and the average bit rate may be reduced by $\alpha\beta B$ only with the frame group corresponding to the temporal ID=1. Similarly, the average bit rate may be further reduced by $(1-\alpha\beta)B$ with the frame group corresponding to the temporal ID=2.

Figure 10:
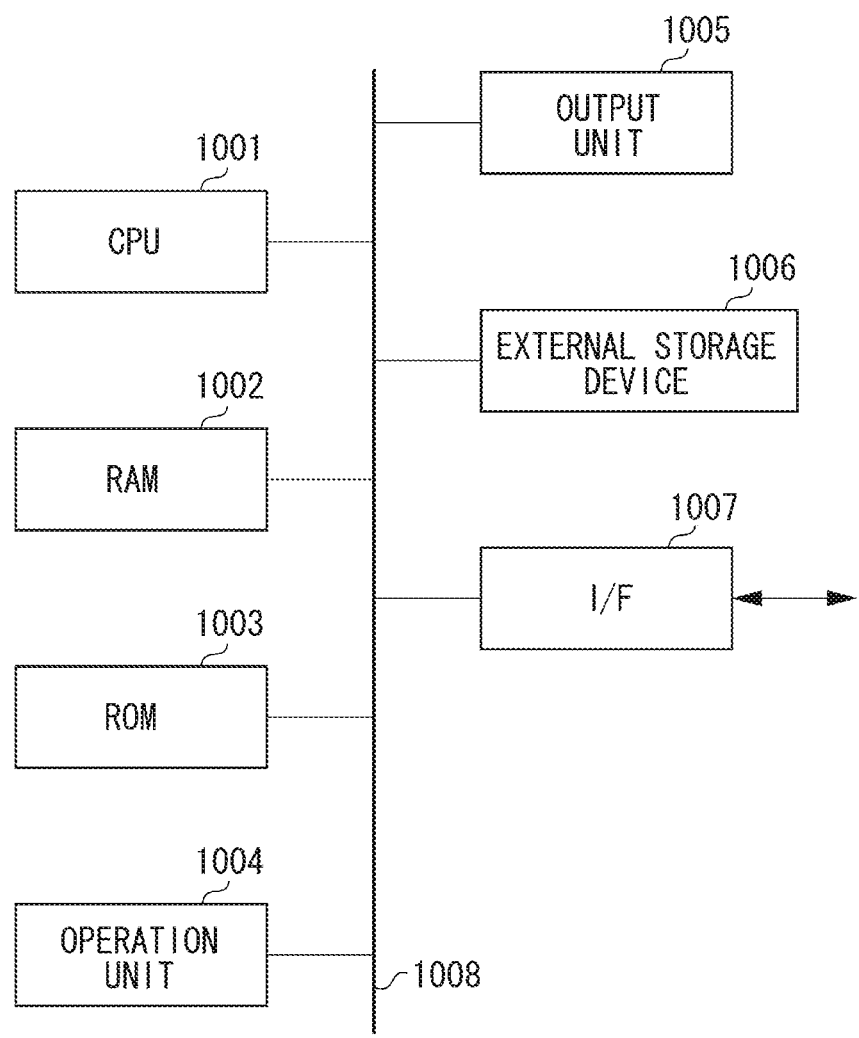
FIG. 10 is a block diagram illustrating an example of a hardware configuration of a computer that can be applied to an image processing apparatus.

A third exemplary embodiment is described below. In the exemplary embodiments described above, the processing units illustrated in FIG. 8 are formed of hardware devices. Alternatively, processing executed by each processing unit illustrated in the figure may be implemented by a computer program. The present exemplary embodiment is described below with reference to FIG. 10. FIG. 10 is a block diagram illustrating an example of a hardware configuration of a computer that can be applied to the image processing system according to the exemplary embodiments described above.

A CPU 1001 controls the entire computer using a computer program and data stored in a random access memory (RAM) 1002 and a read only memory (ROM) 1003, and executes each processing described above as the processing executed by the image processing system according to each exemplary embodiment described above. Thus, the CPU 1001 functions as each processing unit illustrated in FIG. 8.

The RAM 1002 includes an area in which a computer program and data loaded from an external storage device 1006 and data acquired from the outside through an interface (I/F) 1007 are temporarily stored. The RAM 1002 further includes a work area used by the CPU 1001 for executing various types of processing. Thus, for example, the RAM 1002 may be allocated as the work area to a picture memory, and may provide various other areas as appropriate.

The ROM 1003 stores setting data and a boot program for the computer. An operation unit 1004 includes a keyboard, a mouse, and the like. A user of the computer may operate the operation unit 1004 to input various instructions to the CPU 1001. An output unit 1005 displays a result of the processing executed by the CPU 1001, and includes a liquid crystal display for example.

The external storage device 1006 is a large capacity information storage device, typically a hard disk drive device. The external storage device 1006 stores a computer program for causing the CPU 1001 to implement the function of each processing unit in FIG. 8. The external storage device 1006 may further store each image data as the processing target.

The computer program and the data stored in the external storage device 1006 is appropriately loaded onto the RAM 1002 in accordance with the control performed by the CPU 1001 and processed by the CPU 1001. The I/F 1007 may be connected to a network such as a local area network (LAN) and the Internet, and to other devices such as a projection device and a display device. The computer can acquire and transmit various types of information through the I/F 1007. The units described above are connected to each other through a bus 1008.

Operations of the configuration described above is controlled mainly by the CPU 1001 implementing the processing in the flowcharts described above.

In the first and the second exemplary embodiments, only the bit rate at the time of encoding of the frames in the low frame rate hierarchy corresponding to the temporal ID=0 (the frames with the temporal ID equal to or smaller than the first threshold) can exceed the effective transmission rate. However, this should not be construed in a limiting sense. For example, the bit rate may exceed the effective transmission rate only at the time of encoding of the frames in the intermediate frame rate hierarchy corresponding to the temporal ID=0 or 1 (the frames with the temporal ID equal to or smaller than the second threshold). In this case, control may be performed in such a manner that the resultant excess amount is adjusted when the other frames are encoded.

In the first and the second exemplary embodiments, the encoding is performed in such a manner that even when the bit rate at the time of encoding locally exceeds the effective transmission rate, the average bit rate covering all the hierarchies (all the frames with the temporal IDs=0 to 2) does not exceed the effective transmission rate. Thus, the encoding is performed with variable bit rates in the hierarchies corresponding to the temporal IDs. However, this should not be construed in a limiting sense. Alternatively, a target bit rate may be set to each frame rate hierarchy, and the hierarchy corresponding to the temporal ID equal to or smaller than the threshold may be encoded with a fixed bit rate corresponding to the target bit rate, and the other frame rate hierarchy may be encoded with a variable bit rate.

For example, the target bit rates of 40 Mbps, 20 Mbps, and 10 Mbps are set to the high frame rate hierarchy 216, the intermediate frame rate hierarchy 215, and the low frame rate hierarchy 214 in FIG. 2, respectively. The encoding parameter of the frame in the low frame rate hierarchy 214 is determined so that the bit rate does not exceed 10 Mbps, and the frame is encoded with the fixed bit rate. The encoding parameter of the frame in the intermediate frame rate hierarchy 215 is determined so that the bit rate does not exceed 20 Mbps, and the frame is encoded with the variable bit rate. Similarly, the encoding parameter of the frame in the high frame rate hierarchy 216 is determined so that the bit rate does not exceed 40 Mbps, and the frame is encoded with the variable bit rate.

Thus, the frames in the low frame rate hierarchy are encoded in such a manner that the average bit rate does not exceed the effective transmission rate. The frames in the other frame rate hierarchies are encoded in such a manner that the bit rate can locally exceed the effective transmission rate. That is, the encoding can be performed in such a manner that the bit rate at the time of encoding locally exceeds the effective transmission rate, while the average bit rate of the low frame rate hierarchy (hierarchy corresponding to the temporal ID=0) does not exceed the effective transmission rate. Thus, a transmittable and receivable frame rate hierarchy can be easily selected in accordance with the effective transmission rate of the communication path and the processing capacity on the reception side. For example, processing can be implemented in which transmission of the frames in the low frame rate hierarchy 214 is guaranteed as long as the effective transmission rate of 10 Mbps is maintained.

In the first and the second exemplary embodiments described above, the moving image transmission apparatus 800 illustrated in FIG. 8 includes the image capture unit 801, the encoding unit 802, and the network transmission unit 803. However, this should not be construed in a limiting sense. More specifically, the image capture unit 801 and the encoding unit 802 may be separately disposed in different devices.

In the first and the second exemplary embodiments described above, the processing units in the encoding unit 802 that are illustrated in FIG. 11 may be formed of a single physical circuit or a plurality of circuits. The processing units in the encoding unit 802 that are illustrated in FIG. 11 may be controlled by a single general control unit 1107 or a plurality of control units. Moreover, the general control unit 1107 may control a processing unit outside the encoding unit 802 (for example, the image capture unit 801 and the network transmission unit 803), or the general control unit 1107 outside the encoding unit 802 may control the processing units of the encoding unit 802.

In the first and the second exemplary embodiments described above, the method of controlling the QP serving as the encoding parameter is described. However, this should not be construed in a limiting sense. Cutting down processing of the quantization coefficient, i.e., the result of quantization on a predetermined QP, (processing of rounding down the quantization coefficient) may be additionally executed. For example, control is performed in such a manner that the cutting down processing of the quantization coefficient is applied when the effective transmission rate exceeds a predetermined cutting down threshold. Thus, while the image quality is deteriorated, the bit rate at the time of the encoding can be reduced. Furthermore, processing of adaptively switching between a prediction mode determination algorithm for intra prediction and a motion vector determination algorithm for inter prediction may be additionally executed. For example, processing of switching the determination algorithms when the effective transmission rate exceeds the predetermined threshold, or processing of automatically updating the parameter for which the algorithm may be further executed.

Similarly, an algorithm to determine a prediction block size and an encoding block size may be added.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-174494, filed Aug. 28, 2014, which is hereby incorporated by reference herein in its entirety.

What is claimed is:

1. An image processing apparatus configured to encode frames forming a moving image using temporal hierarchies, the frames including at least first frames corresponding to a first temporal hierarchy of the temporal hierarchies and second frames corresponding to a second temporal hierarchy of the temporal hierarchies, the first frames being capable of forming a moving image having a frame rate of a first rate, and third frames including at least the first frames and the second frames being capable of forming a moving image having a frame rate of a second rate higher than the first rate, the image processing apparatus comprising:
   an acquisition unit configured to acquire information related to a temporal hierarchy corresponding to an encoding target frame, the information indicating a temporal hierarchy of the encoding target frame;
   a determination unit configured to determine an encoding parameter based on the information acquired by the acquisition unit; and
   an encoding unit configured to encode the encoding target frame using the encoding parameter determined by the determination unit,
   wherein the determination unit is configured to determine the encoding parameters for the second frames so that an average bit rate of the third frames is equal to or smaller than a predetermined bit rate, and
   wherein the determination unit is configured to determine the encoding parameters for the first frames regardless of the predetermined bit rate.

2. The image processing apparatus according to claim 1, wherein, the determination unit is configured to determine the encoding parameter for the encoding target frame included in the second frames so that the average bit rate of the third frames is equal to or smaller than the predetermined bit rate, based on a bit rate corresponding to at least one past frame encoded before the encoding target frame is encoded.

3. The image processing apparatus according to claim 2, wherein, when the temporal hierarchy corresponding to the encoding target frame is lower than a predetermined threshold, the determination unit determines not to use an encoding parameter based on the bit rate of the at least one past frame, and the encoding unit encodes the encoding target frame using a first encoding parameter with which an image quality is prioritized.

4. The image processing apparatus according to claim 3, wherein when a bit rate at time of encoding a first frame that is one of a plurality of frames forming the moving image and corresponds to a temporal hierarchy lower than a predetermined threshold is larger than a predetermined bit rate, the encoding unit encodes a second frame corresponding to the temporal hierarchy higher than the predetermined threshold using an encoding parameter based on a result of weighting a difference value between the bit rate at the time of encoding the first frame and the predetermined bit rate based on the temporal hierarchy.

5. The image processing apparatus according to claim 2, wherein, when the temporal hierarchy corresponding to the encoding target frame is higher than a predetermined threshold, the determination unit determines to use the encoding parameter based on the bit rate of the at least one past frame, and the encoding unit encodes the encoding target frame using a second encoding parameter based on a data amount after the at least one past frame is encoded and an encoding parameter used to encode a frame in the at least one frame.

6. The image processing apparatus according to claim 5, wherein, when the temporal hierarchy corresponding to the encoding target frame is higher than the predetermined threshold, and a first bit rate based on a data amount after the at least one past frame is encoded is larger than the predetermined bit rate which is a bit rate of a communication path through which an encoded frame is transferred, the encoding unit encodes the encoding target frame using the second encoding parameter based on the first bit rate, the second bit rate, and an encoding parameter used to encode a frame in the at least one frame.

7. The image processing apparatus according to claim 5, wherein when the temporal hierarchy corresponding to the encoding target frame is higher than the predetermined threshold, and a first bit rate based on a data amount after the at least one past frame is encoded is smaller than the predetermined bit rate which is a bit rate of a communication path through which an encoded frame is transferred, the encoding unit encodes the encoding target frame using a third encoding parameter based on an encoding parameter used to encode a frame in the at least one past frame.

8. The image processing apparatus according to claim 5, wherein the second encoding parameter is larger than a first encoding parameter with which the image quality is prioritized.

9. The image processing apparatus according to claim 1, wherein the encoding parameter includes a quantization parameter.

10. The image processing apparatus according to claim 1, further comprising a setting unit configured to set a control method for controlling a bit rate for a frame group belonging to a temporal hierarchy corresponding to the encoding target frame,
   wherein the setting unit is configured to set as the control method, at least one of a method for controlling a bit rate for each hierarchy based on an effective transmission rate of a communication path through which the encoding target frame that has been encoded is transferred, a method for controlling the bit rate for each hierarchy based on a target image quality, a method for controlling the bit rate for each hierarchy based on a remaining capacity of a storage unit configured to store the encoding target frame that has been encoded, and a method for controlling the bit rate for each hierarchy based on an accumulated amount in a transmission buffer configured to store the encoding target frame that has been encoded as a transferring target.

11. The image processing apparatus according to claim 1, wherein the determination unit is configured to determine a method for controlling a bit rate to encode the encoding target frame based on information related to the temporal hierarchy acquired by the acquisition unit, and to determine an encoding parameter to encode the encoding target frame based on the method for controlling the bit rate.

12. The image processing apparatus according to claim 11 wherein the method for controlling the bit rate is at least one of a method for controlling the bit rate based on an effective transmission rate of a communication path through which the encoding target frame that has been encoded is transmitted, a method for controlling the bit rate based on a target image quality set by an instruction from a user, and a method for controlling the bit rate based on a remaining capacity of a storage medium configured to store encoded data obtained by encoding the encoding target frame.

13. An image processing method to encode frames forming a moving image using temporal hierarchies, the frames including at least first frames corresponding to a first temporal hierarchy of the temporal hierarchies and second frames corresponding to a second temporal hierarchy of the temporal hierarchies, the first frames being capable of forming a moving image having a frame rate of a first rate, and third frames including at least the first frames and the second frames being capable of forming a moving image having a frame rate of a second rate higher than the first rate, the image processing method comprising:
    acquiring information related to a temporal hierarchy corresponding to an encoding target frame, the information indicating a temporal hierarchy of the encoding target frame;
    determining an encoding parameter based on the information; and
    encoding the encoding target frame using the encoding parameter,
    wherein the encoding parameters for the second frames are determined so that an average bit rate of the third frames is equal to or smaller than a predetermined bit rate, and
    wherein the encoding parameters for the first frames are determined regardless of the predetermined bit rate.

14. A non-transitory computer-readable storage medium storing a program for causing a computer to execute a method to encode frames forming a moving image using temporal hierarchies, the frames including at least first frames corresponding to a first temporal hierarchy of the temporal hierarchies and second frames corresponding to a second temporal hierarchy of the temporal hierarchies, the first frames being capable of forming a moving image having a frame rate of a first rate, and third frames including at least the first frames and the second frames being capable of forming a moving image having a frame rate of a second rate higher than the first rate, the method comprising:
    acquiring information related to a temporal hierarchy corresponding to an encoding target frame, the information indicating a temporal hierarchy of the encoding target frame;
    determining an encoding parameter based on the information; and
    encoding the encoding target frame using the encoding parameter,
    wherein the encoding parameters for the second frames are determined so that an average bit rate of the third frames is equal to or smaller than a predetermined bit rate, and
    wherein the encoding parameters for the first frames are determined regardless of the predetermined bit rate.

* * * * *